United States Patent [19]
Ikegaya et al.

[11] Patent Number: 5,708,842
[45] Date of Patent: Jan. 13, 1998

[54] APPARATUS FOR CHANGING COEFFICIENTS UTILIZED TO PERFORM A CONVOLUTION OPERATION HAVING ADDRESS GENERATOR WHICH USES INITIAL COUNT NUMBER AND UP/DOWN COUNT INPUTS RECEIVED FROM EXTERNAL

[75] Inventors: Yuji Ikegaya; Shinichi Muramatsu; Toru Shirayanagi, all of Hamamatsu, Japan

[73] Assignee: Yamaha Corporation, Japan

[21] Appl. No.: 822,770

[22] Filed: Mar. 21, 1997

Related U.S. Application Data

[63] Continuation of Ser. No. 361,989, Dec. 22, 1994, abandoned.

[30] Foreign Application Priority Data

Dec. 29, 1993 [JP] Japan ................................. 5-352248

[51] Int. Cl.⁶ .......................... G06F 12/04; G06F 13/00
[52] U.S. Cl. ........................... 395/800; 395/421.07
[58] Field of Search ................. 395/421.07, 421.08, 395/421.09, 800, 823, 824

[56] References Cited

U.S. PATENT DOCUMENTS

| Re. 29,642 | 5/1978 | Kwiatkowski et al. | 395/550 |
|---|---|---|---|
| 4,099,230 | 7/1978 | Mead | 395/183.14 |
| 4,257,108 | 3/1981 | Igel | 327/258 |
| 4,583,163 | 4/1986 | Kobayashi et al. | 395/250 |
| 4,604,695 | 8/1986 | Widen et al. | 395/421.07 |
| 5,163,018 | 11/1992 | Ikegaya et al. | 364/728.02 |
| 5,307,472 | 4/1994 | Chateau et al. | 395/421.07 |

FOREIGN PATENT DOCUMENTS

| 0 354 590 | 2/1990 | European Pat. Off. |
| 0 474 246 | 3/1992 | European Pat. Off. |
| 1-105611 | 4/1989 | Japan |
| 3-217122 | 9/1991 | Japan |

OTHER PUBLICATIONS

David E. Borth, et al., "A Flexible Adaptive FIR Filter VLSI IC", IEEE Journal on Selected Areas in Communications, Apr. 1988, Vo. 6, No. 3, pp. 494–503.

J. O'Brien, et al.,"Digital Video & Image PRocessors A 200 MIPS Single–Chip IK FFT Processor", IEEE Internatinal Solid State Circuits Conference, Feb. 1, 1989, Vo. 32, pp. 166–167, 327.

Warner, B.H. Jr.; "Very Long Shift Registers Can be Built with RAM"; Electronic Design; vol. 25, No. 1, p. 128.

Pancost, R. & Linde, Y; "Shift Register FIFO"; Motorola Technical Development vol. 3, pp. 79–80, Mar. 1983.

*Primary Examiner*—Meng-Al T. An
*Attorney, Agent, or Firm*—Graham & James LLP

[57] ABSTRACT

A digital signal processing circuit, which is embodied by a digital signal processor (i.e., DSP), comprises at least an address counter and a coefficient RAM which is provided to store coefficients used for convolution processing to be performed. An overall storage area of the coefficient RAM exists between a first address and a last address. An external device provides control information including an initial count number and up/down information. The address counter counts a number of pulses included in a timing signal, which is produced in synchronism with bit clocks in a sampling period, so as to output a count number as a write address for the coefficient RAM. The address counter performs either an up-counting or a down-counting in accordance with the up/down information; and the count number thereof is increased or decreased from the initial count number. Hence, the coefficients sequentially inputted are written into the coefficient RAM at the respective write addresses. When the write address is increased to the last address or is decreased to the first address, the address counter outputs a carry signal, by which the coefficients inputted afterwards are not written into the coefficient RAM but are automatically transferred to the next DSP in which they are stored.

8 Claims, 6 Drawing Sheets

APPARATUS FOR CHANGING COEFFICIENTS UTILIZED TO PERFORM A CONVOLUTION OPERATION HAVING ADDRESS GENERATOR WHICH USES INITIAL COUNT NUMBER AND UP/DOWN COUNT INPUTS RECEIVED FROM EXTERNAL

This is a continuation of application Ser. No. 08/361,989 filed on Dec. 22, 1994, now abandoned.

BACKGROUND OF THE INVENTION

1. Field of the Invention

The present invention relates to a digital signal processing circuit which is used to impart a variety of acoustic effects, such as reverberation effect to audio signals.

2. Prior Art

Conventionally, a digital signal processor (i.e., DSP) is used as the digital signal processing circuit which performs convolution processing using coefficients on a string of sampling data representative of audio signals. This DSP is effective to impart a variety of acoustic effects, such as the reverberation effect, to the audio signals.

If the coefficients used by the convolution processing can be freely changed, it is possible to impart a variety of acoustic effects to the audio signals by using one DSP only. Meanwhile, some acoustic effect to be realized requires a relatively large 'tap number' for the convolution processing. Herein, the tap number is determined by the performance of the DSP and the number of the DSPs included in the computing device performing the convolution processing. In order to realize the convolution processing having the large tap number, it is necessary to combine the multiple DSPs in the computing device. Meanwhile, there is provided a new DSP which is capable of rewriting the coefficients, used for the convolution processing, in accordance with the instruction given from the external device or the like.

FIG. 5 is a block diagram showing an electronic configuration of a computing device which is configured by using the multiple DSPs and which is capable of performing the convolution processing having the large tap number. In FIG. 5, symbols $A_1$ to $A_n$ denote DSPs each of which is capable of performing the convolution processing. Each of those DSPs $A_1$ to $A_n$ inputs sampling data, representing a set of instantaneous values of the audio signal, by each sampling period through an input interface DI thereof. Herein, the sampling data is inputted into each DSP $A_k$ (where k=1, 2 . . . , n) in a serial manner so that the DSP serially inputs the bits of the sampling data, while the DSP $A_k$ receives bit clocks BCLK, each of which synchronizes with each of the bits of the sampling data. The DSP $A_k$ also receives a sampling-frequency-synchronization signal SYNC representative of a timing at which the current sampling period is switched to the next sampling period. The DSP $A_k$ inputs each of the bits of the sampling data in synchronism with the bit clock BCLK; and then the DSP $A_k$ forms one word of sampling data by using a certain number of bits which are supplied thereto until the sampling-frequency-synchronization signal SYNC is given. Thus, the convolution processing, using the coefficients, is performed on a certain number of sampling data, which the DSP has inputted previously, in each sampling period; and then the DSP outputs the result of the convolution processing. The oldest sampling data, among the multiple sampling data on which the convolution processing is performed, is outputted from an output interface DO of the DSP $A_k$ in a serial manner.

Then, that sampling data whose bits are serially outputted from one DSP $A_k$ is inputted into the input interface DI of a next DSP $A_{k+1}$ in a serial manner. The results of the convolution processing, given by the DSPs $A_1$ to $A_k$ respectively, are supplied to an adder (or adders) by which they are added together. As described before, the DSP $A_k$ can perform the convolution processing having a certain tap number; hence, the multiple DSPs $A_1$–$A_n$ can perform the convolution processing, having the tap number, by 'n' times. The adder outputs the overall result of the convolution processing.

An address decoder DEC receives address information from a central processing unit (i.e., CPU, not shown in FIG. 5) through a bus. The address information is used to designate the DSP, from among the DSPs $A_1$–$A_n$, into which the coefficients should be written. This address information is decoded by the address decoder DEC, so that the address decoder DEC produces a circuit selection signal CS and sends it to the DSP which corresponds to the address information within the DSPs $A_1$–$A_n$. The coefficients which should be written are given from the CPU through the bus and are supplied to a coefficient-input interface CI of each of the DSPs $A_1$–$A_n$. Each of the DSPs $A_1$–$A_n$ also receives clocks for writing the coefficients. Then, the coefficients are inputted into one DSP, to which the circuit selection signal CS is supplied, within the DSPs $A_1$–$A_n$.

In the computing device as shown in FIG. 5, it is possible to write the coefficients, used for the convolution processing, into one DSP which is arbitrarily selected. However, this computing device has the drawbacks, as follows:

① Since the computing device described above is designed to receive a variety of information, such as the coefficients and address information, from the CPU through the bus and to perform the corresponding processing, it is necessary to provide a plenty of signal lines which are required to receive a variety of information.

② The computing device requires a circuit which is specifically used to select the DSP, into which the coefficients are written, from among the multiple DSPs $A_1$–$A_n$.

In order to cope with the drawbacks described above, a new proposal for the design of the DSP is made, according to which the DSP is capable of sequentially inputting the coefficients from the external device or the like so as to shift them inside of the DSP. FIG. 6 shows an example of the computing device, utilizing the above-mentioned DSP newly proposed, which performs the convolution processing having the large tap number. In FIG. 6, symbols $B_1$ to $B_n$ denote DSPs, each of which is capable of inputting the coefficients and shifting them. Each DSP '$B_k$' provides a data-input interface DI for receiving the sampling data and a data-output interface DO for outputting the sampling data as well as terminals for receiving the sampling-frequency-synchronization signal SYNC and the bit clocks BCLK respectively. In addition, the DSP $B_k$ provides a coefficient-input interface CI and a coefficient-output interface CO as well as an input interface SCI and an output interface SCO which are provided for a coefficient-input-control signal.

In a writing mode for the coefficients, the coefficients are sequentially inputted into the coefficient-input interface of the first DSP $B_1$. In a duration in which those coefficients are inputted into the DSP $B_1$, the coefficient-input-control signal is supplied to the input interface SCI. Thus, the coefficients sequentially inputted are written into the shift registers (not shown) provided in the DSP $B_1$; hence, the coefficients, which have been already written in the shift registers, are shifted every time a new coefficient is written. The coefficients stored by the shift registers are used for the convolution processing to be performed by the DSP $B_1$. The coefficient, which is shifted out from the last shift register within the shift registers provided in the DSP $B_1$, is outputted from the coefficient-output interface CO and is inputted into the coefficient-input interface CI of the next DSP $B_2$. At the same time, the coefficient-input-control signal is outputted from the output interface SCO of the DSP $B_1$ and is inputted into the input interface SCI of the DSP $B_2$.

The above-mentioned operations are performed by each of the DSPs $B_1$ to $B_n$. Thus, the coefficients, used for the convolution processing, are rewritten in each of the DSPs $B_1$ to $B_n$.

The DSP like the above-mentioned DSPs $B_1$–$B_n$ is disclosed by Japanese Patent Laid-Open No. 3-217112 which corresponds to Japanese Patent Application No. 2-13387 filed by the present applicant.

The DSP as shown in FIG. 6 is advantageous in that the circuit for rewriting the coefficients can be configured in the DSP with a small number of signal lines and the circuit for selecting the DSP is not required. However, the above DSP as shown in FIG. 8 has the drawbacks, as follows:

① In order to set desired coefficients, for the convolution processing, in the DSP shown in FIG. 6, it is necessary to rewrite the coefficients with respect to all of the DSPs. Hence, a complex control should be performed to do so.

② The DSP shown in FIG. 6 is designed such that the coefficients are rewritten by shifting them in the shift registers. Hence, during a relatively long period of time in which the rewriting of the coefficients is completed, un-desired convolution processing should be performed.

SUMMARY OF THE INVENTION

It is an object of the present invention to provide a digital signal processing circuit which is capable of speedily changing the coefficients for the convolution processing without providing the complex circuit configuration.

According to the present invention, a digital signal processing circuit, which is embodied by a digital signal processor (i.e., DSP), comprises at least an address counter and a coefficient RAM which is provided to store the coefficients used for the convolution processing to be performed. An overall storage area of the coefficient RAM exists between a first address and a last address. An external device provides control information including an initial count number and up/down information. The address counter counts a number of pulses included in a timing signal, which is produced in synchronism with the bit clocks in a sampling period, so as to output a count number as a write address for the coefficient RAM. The address counter performs either an up-counting or a down-counting in accordance with the up/down information; and the count number thereof is increased or decreased from the initial count number. Hence, the coefficients sequentially inputted are written into the coefficient RAM at the respective write addresses.

When the write address is increased to the last address or is decreased to the first address, the address counter outputs a carry signal, by which the coefficients inputted afterwards are not written into the coefficient RAM but are automatically transferred to the next DSP.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings.

DESCRIPTION OF THE PREFERRED EMBODIMENT

Figure 1:
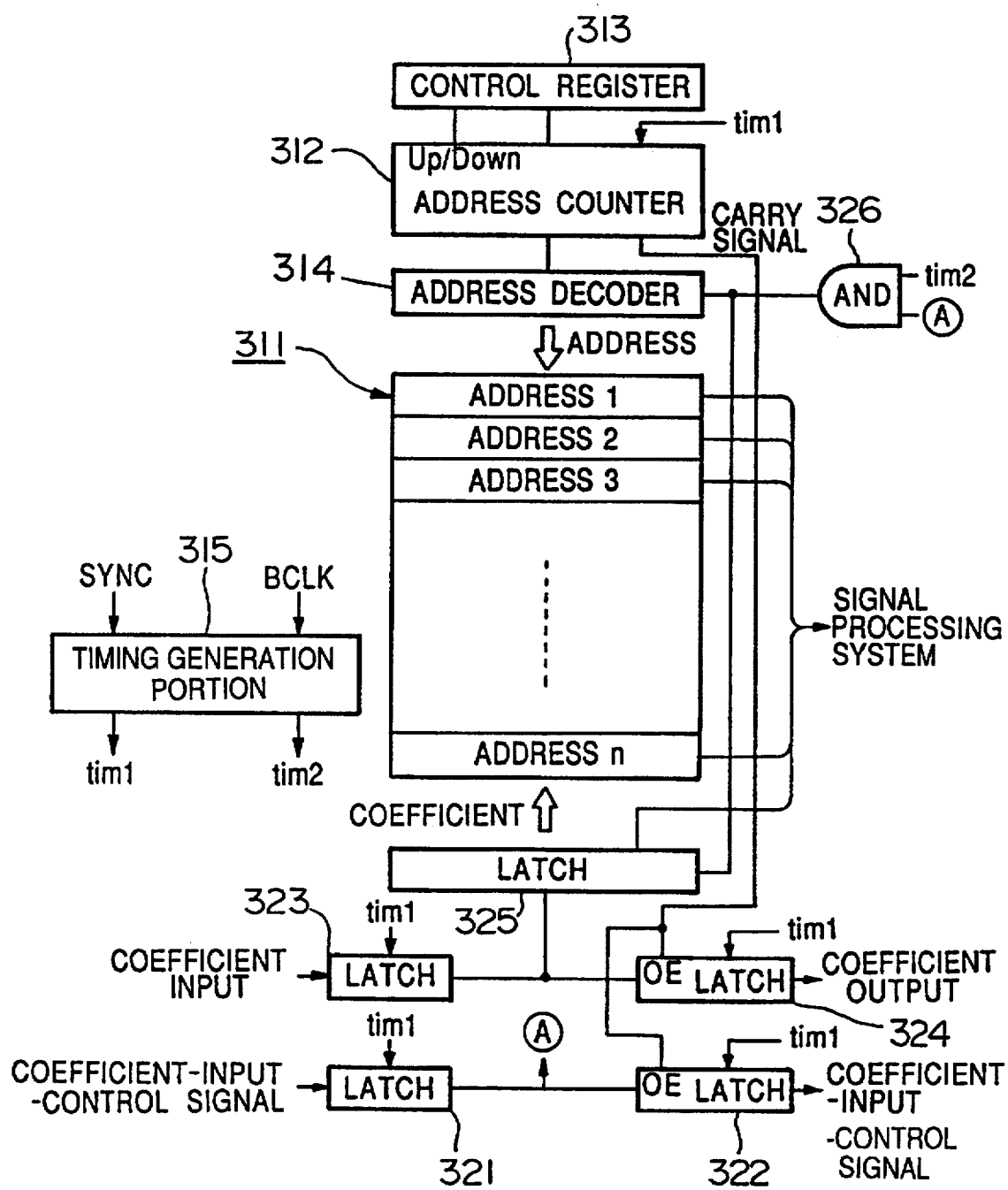
FIG. 1 is a block diagram showing a main part of a DSP which is an embodiment of a digital signal processing circuit according to the present invention.

FIG. 1 is a block diagram showing a circuit configuration of a DSP which is a digital signal processing circuit according to an embodiment of the present invention.

In FIG. 1, a numeral 311 denotes a coefficient RAM (where 'RAM' is an abbreviation for random-access memory) which stores the coefficients. The coefficients, stored in the coefficient RAM 311, are read out by a signal processing system (not shown) and are used for the convolution processing which is performed on the sampling data inputted. An address counter 312 counts a number of pulses included in a timing signal 'tim1' inputted thereto. Then, the count number is outputted from the address counter 312 as a write address for the coefficient RAM 311. The address counter 312 is designed in such a manner that the up-counting and down-counting can be selectively changed over and the count number thereof can be reset to an initial count number which is determined in advance. When the count number of the address counter 312 reaches an upper-limit number or a lower-limit number, the address counter 312 outputs a carry signal. In the present embodiment, the upper-limit number is represented by 'n', while the lower-limit number is set at '1'. A control register 313 stores control information which is used to control the address counter 312. The control information contains up/down information, which designates a direction of counting (i.e., up-counting or down-counting) of the address counter 312 and the initial count number. The control information is written into the control register 313 by an external CPU (not shown). An address decoder 314 decodes the count number of the address counter 312 so as to select a specific address, corresponding to the count number, for the coefficient RAM 311. Thus, data is written into the coefficient RAM 311 at the address which is selected as described above.

A timing generation portion 315 inputs the sampling-frequency-synchronization signal SYNC and the bit clocks BCLK. As described before, the sampling-frequency-synchronization signal SYNC is the signal which synchronizes with the sampling frequency of the sampling data representative of the audio signal inputted, while the bit clock BCLK synchronizes with each of the bits which form the sampling data. In response to those signals SYNC and BCLK, the timing generation portion 315 generates timing signals 'tim1' and 'tim2' which are used to change the coefficients. Latches 321 and 322 latch the coefficient-input-control signals, respectively inputted thereto, in response to the timing signal tim1. Similarly, latches 323 and 324 latch the coefficients, respectively inputted thereto, in response to the timing signal tim1. When receiving the carry signal, which is outputted from the address counter 312, the latches 322 and 324 are set in an output-enable state.

An AND gate 326 inputs the timing signal tim2 and an output signal of the latch 321 so as to output a logical product. When the logical product outputted from the AND gate 326 turns to be at '1', the address decoder 314 is set in an output-enable state, so that the selection of the address is carried out as described before. In contrast, when the logical product of the AND gate 326 is at '0', the selection of the address is not carried out; hence, it is impossible to write the data into any of the addresses of the coefficient RAM 311. When the logical product of the AND gate 326 turns to '1', the latch 325 is activated to latch output data of the latch 323. Output data of the latch 325 is written into the coefficient RAM 311 at the address which is selected by the address decoder 314.

Figure 2:
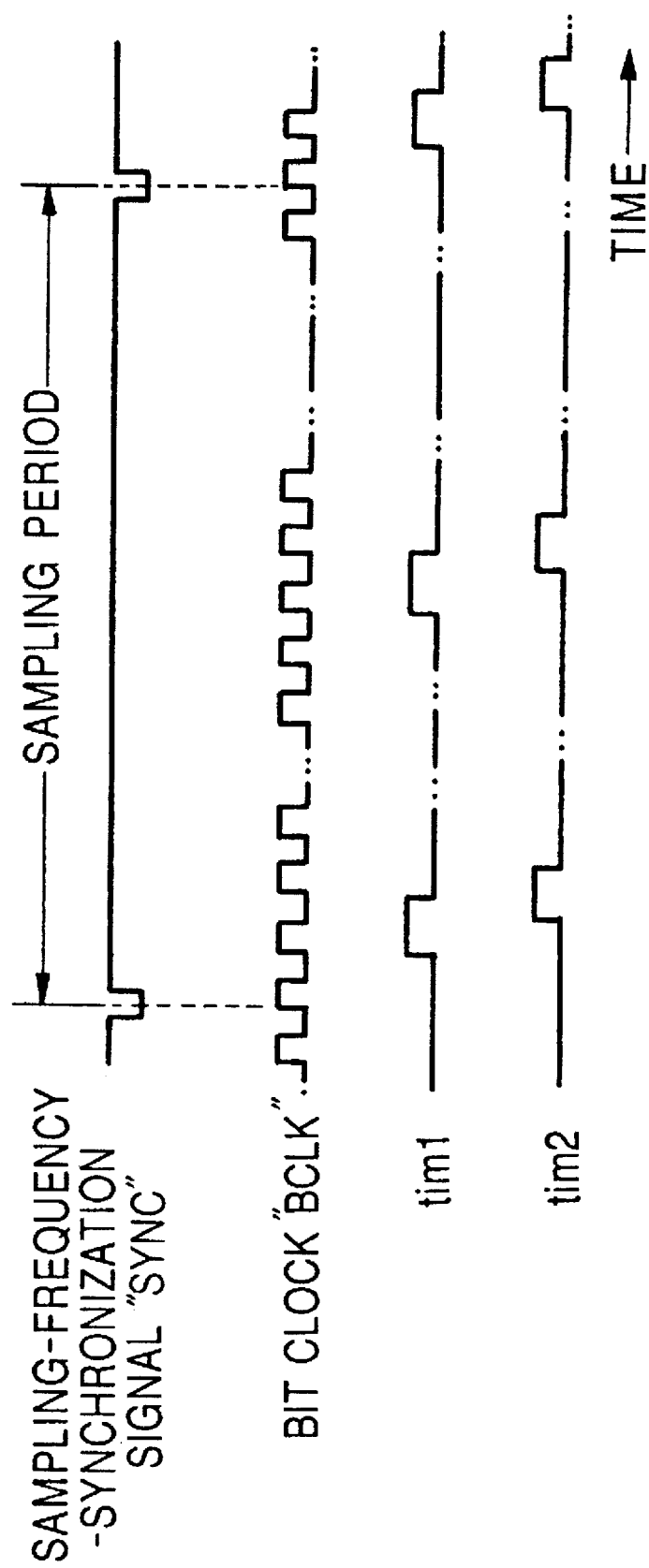
FIG. 2 is a time chart showing signals and clocks which are used by the DSP shown in FIG. 1.

Next, the operations of the present embodiment will be described in detail. FIG. 2 shows a time chart for several kinds of signals; herein, the level of the sampling-frequency-synchronization signal, which is normally set at high level (i.e., '1' level), is decreased to low level (i.e., '0' level) in a certain period of time in proximity to a changing point between the sampling periods. A certain number of bit clocks BCLK are produced in one sampling period. The timing signal tim1 is produced multiple times in one sampling period in synchronism with a leading-edge timing of the bit clock BCLK. Similarly, the timing signal tim2 is produced multiple times in one sampling period in synchronism with the timing signal tim1, wherein a leading-edge timing of the timing signal tim2 is delayed behind the leading-edge timing of the timing signal tim1 by a half period of the bit clock BCLK.

Figure 3:
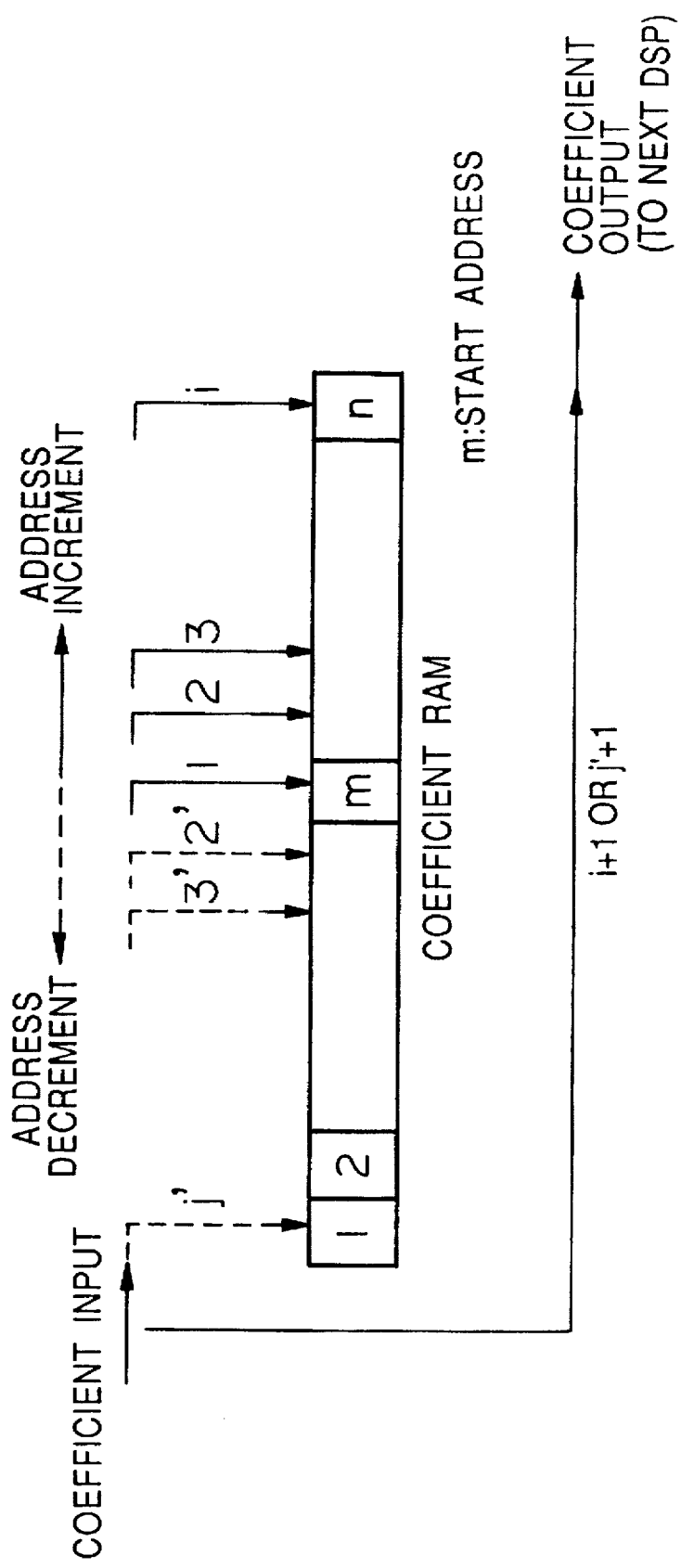
FIG. 3 is a drawing which is used to explain operations of the DSP.

FIG. 3 is a drawing which is used to explain the writing processing for the coefficient RAM 311 in the present embodiment. Now, the writing processing will be described with reference to FIGS. 1 and 3. Before performing the writing processing on the coefficients, the control information is written into the control register 313 in synchronism with a timing signal tim3 which is given from a control interface (not shown). Herein, the control information contains information representative of the address into which first coefficient should be written (hereinafter, referred to as "start address m"), and the foregoing up/down information representative of the direction of counting. The control interface is provided to output the timing signal tim3 and the control information in response to an instruction given from the external CPU (not shown).

Now, a first set of the coefficient-input-control signal and the coefficient, which should be written into the coefficient RAM 311, are supplied to the latches 321 and 323 respectively. Then, the aforementioned start address is set to the address counter 312 as the initial count number in response to the timing signal tim1 outputted from the timing generation portion 315. The above-mentioned coefficient-input-control signal and coefficient are respectively written into the latches 321 and 323 in response to the timing signal tim1. The timing signal tim2 is generated and outputted from the timing generation portion 315 when a certain time is passed away after the generation of the timing signal tim1. The AND gate 326 inputs the timing signal tim2 as well as the coefficient-input-control signal which is outputted from the latch 321. Hence, when the timing signal tim2 is outputted, the logical product of the AND gate 326 turns to '1'. At this time, the coefficient, which is currently outputted from the latch 323, is written into the latch 325 and is then written into the coefficient RAM 311 at the write address (or start address) 'm' which is selected by the control information. The write address m is indicated by an arrow "1" in FIG. 3.

Thereafter, a second set of coefficient-input-control signal and coefficient are supplied to the latches 321 and 323 respectively. The processing for them will be described below.

Under the state where the up/down information, included in the control information stored in the control register 313, designates the up-counting, the count number of the address counter 312, which is now set equal to the initial count number representative of the start address m, is increased by '1' in response to the timing signal tim1. The second set of coefficient-input-control signal and coefficient are written into the latches 321 and 323 respectively in response to the timing signal tim1. Thereafter, the timing signal tim2 is outputted from the timing generation portion 315, so that the logical product of the AND gate 326 turns to '1'. Thus, the coefficient is written into the coefficient RAM 311 at the address corresponding to the count number of the address counter 312 which is now set at 'm+1'. This writing operation is indicated by an arrow "2" in FIG. 3.

Thereafter, a third set of coefficient-input-control signal and coefficient are given. In this case, the similar operations, which are described before, are performed on them. Every time a new set of coefficient-input-control signal and coefficient are given, the count number of the address counter 312 is increased as follows: 'm+2', 'm+3', . . . Hence, the coefficient newly given is written into the coefficient RAM 311 at the address corresponding to the increased count number. Thus, the coefficients are sequentially written into the coefficient RAM 311 at the respective addresses. When the count number of the address counter 312 reaches the upper-limit number, the coefficient is written into the coefficient RAM 311 as indicated by an arrow "i" in FIG. 3. In that case, however, the address counter 312 outputs the carry signal, so that both of the latches 322 and 324 are set in the output-enable state. After that, the coefficient-input-control signal and coefficient are respectively outputted from the latches 322 and 324 in synchronism with the timing signal tim1, so that the coefficient-input-control signal and coefficient are outputted to the next DSP, having the same configuration of the DSP shown in FIG. 1, in which they are inputted into the latches similar to the latches 321 and 323 shown in FIG. 1.

If the control information stored in the control register 313 designates the down-counting, the count number of the address counter 312 is decreased every time a new set of coefficient-input-control signal and coefficient are given. Hence, the write address of the coefficient RAM 311 is changed, in response to the count number decreased, as follows: 'm', 'm−1', . . . '1'. Thus, the coefficients are sequentially written into the coefficient RAM 311 at the addresses 'm', 'm−1', . . . '1' respectively. The writing operations for those coefficients are indicated by arrows "2'", "3'", . . . "j'" in FIG. 3. After the writing operation is completed with respect to the address 1, the address counter 312 outputs the carry signal, so that the coefficient-input-control signal and coefficient are transferred to the next DSP.

Figure 4:
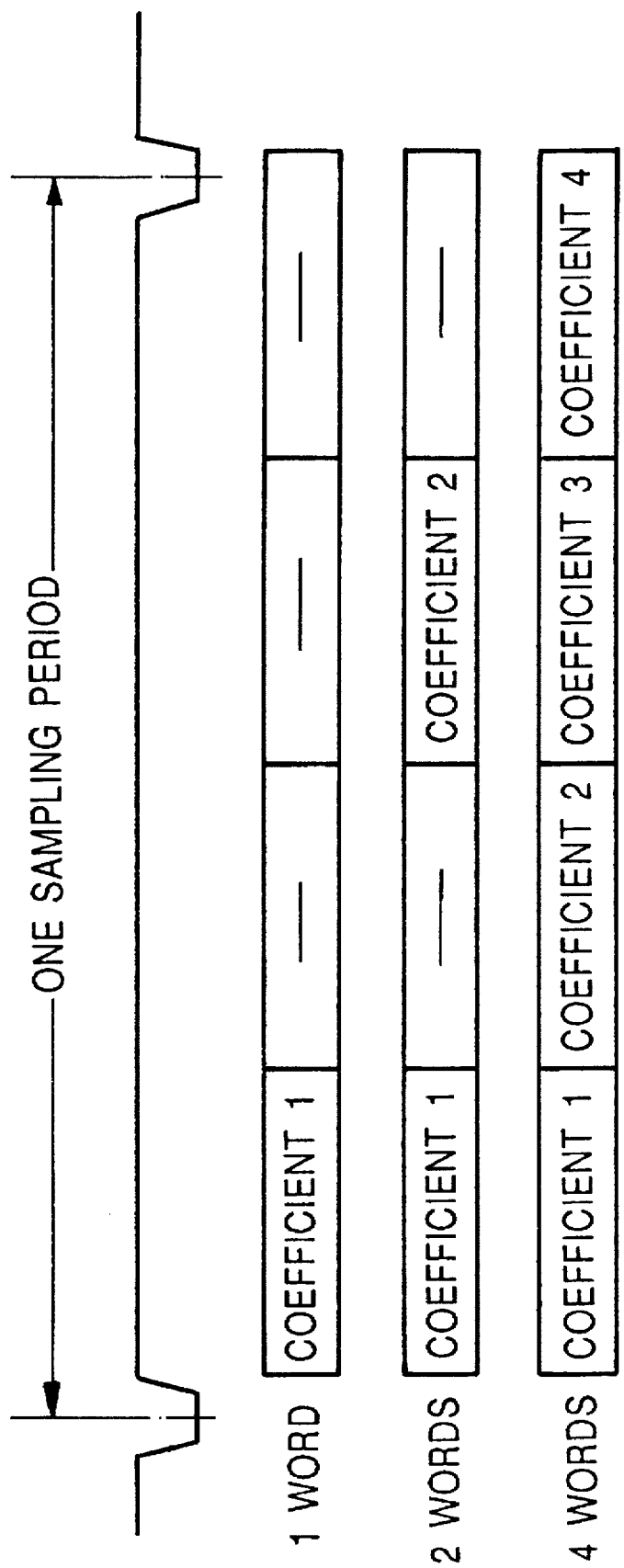
FIG. 4 is a time chart showing a relationship between the sampling period and the coefficients to be written in the DSP.
Figure 5:
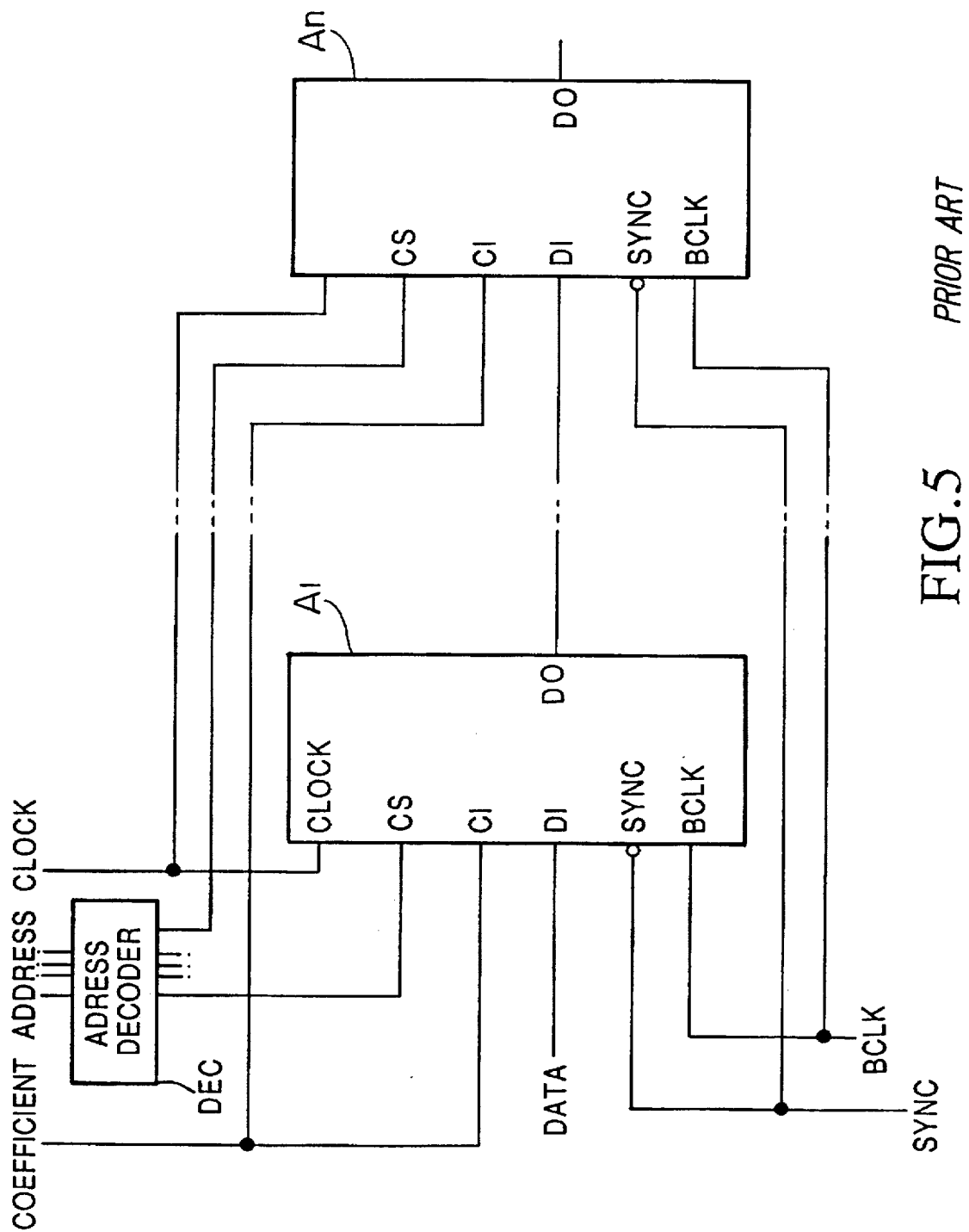
FIG. 5 is a block diagram showing an example of the computing device conventionally known.
Figure 6:
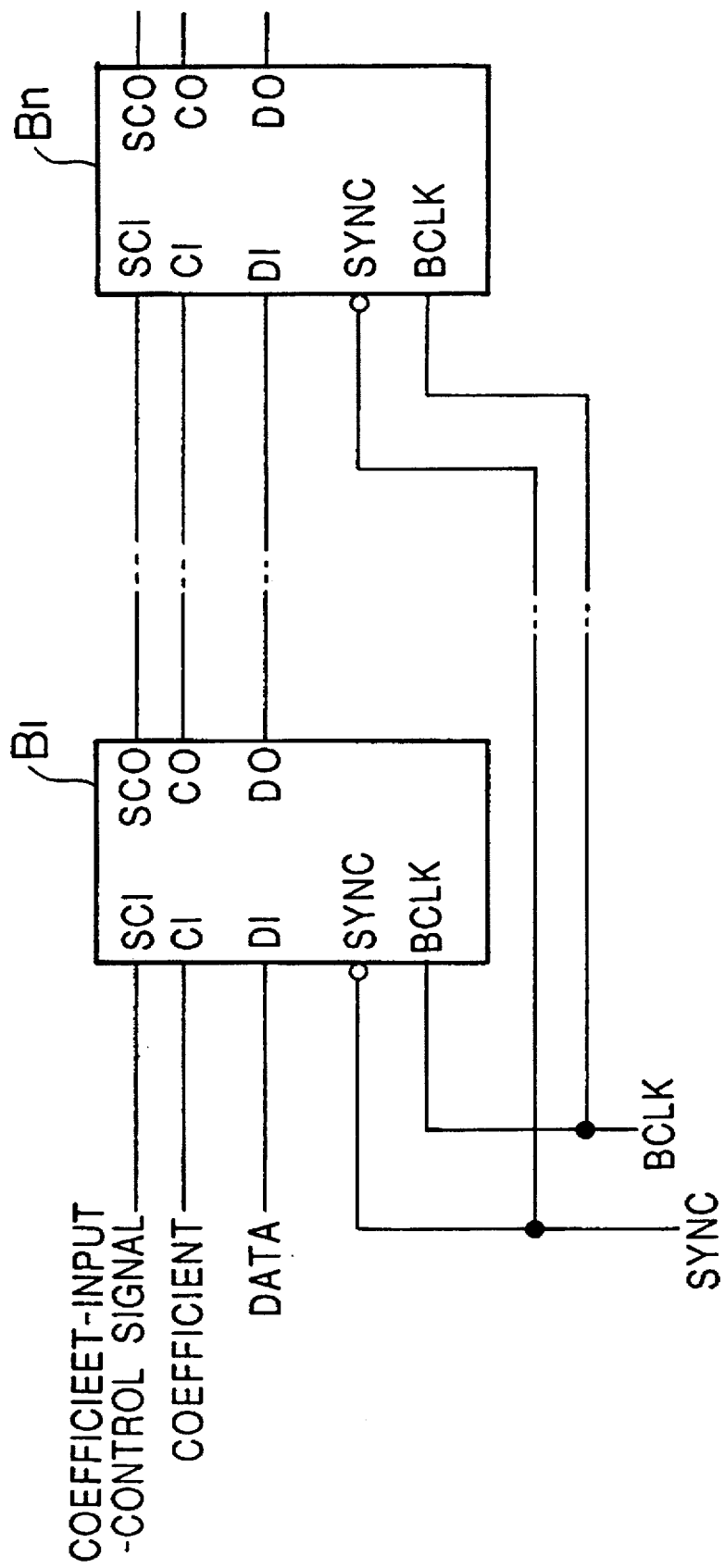
FIG. 6 is a block diagram showing another example of the computing device conventionally known.

In the DSP, according to the present embodiment, which processes the sampling data, it is possible to input the coefficients in synchronism with the sampling periods; hence, a simple configuration can be employed for the peripheral circuit which is provided for the DSP and is provided to input the coefficients. In addition, it is possible to input multiple coefficients in synchronism with the timing signal tim1 which is produced multiple times in one sampling period. FIG. 4 shows a time chart for the DSP which is designed to input four coefficients in one sampling period. In the present embodiment, a string of coefficients are written into the coefficient RAM 311 at successive addresses. For example, when it is required to perform the convolution processing with respect to four channels, the addresses of the coefficient RAM 311 are classified into four groups of addresses, respectively represented by address 4L (where L=0, 1, 2, . . . ), address 4L+1, address 4L+2 and address 4L+3 which are provided for channel 0, channel 1, channel 2 and channel 3 respectively. Those channels are included in one DSP, so that each channel performs the convolution processing using the data and coefficient specifically assigned thereto. In that case, the signal processing system, which uses the coefficients stored in the coefficient RAM 311, is capable of accessing to the certain address which corresponds to the desired channel. Moreover, the DSP according to the present embodiment is designed such that if the number of the coefficients is so large that some of them are overflown and are not written in the coefficient RAM of one DSP, the coefficients overflown and their corresponding coefficient-input-control signals are automatically transferred to the next DSP. Thus, by merely supplying the coefficient-input-control signals and coefficients to one DSP, the coefficients can be written at the desired address of the coefficient RAM in the DSP.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A digital signal processing circuit which performs convolution processing on sampling data utilizing stored coefficients, said digital signal processing circuit comprising:

a coefficient memory for storing said coefficients;

coefficient input means for receiving a coefficient input from an external device;

address generating means for generating a sequence of write addresses for said coefficient memory based upon an initial count number and up/down count inputs received from said external device; and writing means, responsive to said coefficient input signal received from an external device, for writing said received coefficient into a location in said coefficient memory corresponding to said write address.

2. A digital signal processing circuit which performs convolution processing using stored coefficients on sampling data, said digital signal processing circuit comprising:

coefficient storage means for storing said coefficients;

coefficient input means for sequentially receiving new coefficients;

address generating means for generating a sequence of write addresses for said coefficient storage means by incrementing or decrementing an initial number in accordance with control data received from an external source, said control data defining said initial number and an amount of said incrementing or decrementing; and writing control means for controlling said coefficient input means such that said new coefficients are written into said coefficient storage means at locations corresponding to said write addresses generated by said address generating means.

3. A digital signal processing circuit according to claim 2 further comprising:

coefficient output means for outputting at least one of said new coefficients to another digital signal processing circuit; and means for activating said coefficient output means when said write address generated by said address generating means is increased to a last address or decreased to a first address of said coefficient storage means.

4. A digital signal processing circuit according to claim 2, wherein the address generating means generates a predetermined number of addresses during a sampling period.

5. A digital signal processing circuit according to claim 2, wherein the coefficient storage means is a random access memory.

6. A digital signal processing circuit according to claim 2, wherein the address generating means comprises:

an address counter for counting pulses in a timing signal and outputting said count as a generated address; and a control register for storing said control data.

7. A digital signal processing circuit that performs convolution processing using stored coefficients on sampling data, said digital signal processing circuit comprising:

coefficient storage means for storing said coefficients;

coefficient input means for sequentially receiving new coefficients;

address generating means for generating a sequence of write addresses for said coefficient storage means by incrementing or decrementing an initial number received from an external source in accordance with an up/down count indicator received from an external source, said initial number corresponding to a first write address in said sequence of write addresses to be generated and said up/down count indicator indicating whether said sequence of write addresses is to be generated by incrementing or decrementing said initial number; and writing control means for controlling said coefficient input means such that said new coefficients are written into said coefficient storage means at locations corresponding to said write addresses generated by said address generating means.

8. The digital signal processing circuit of claim 7, wherein said address generating means further generates said sequence of write addresses in accordance with an upper limit number corresponding to a last write address in said sequence of write addresses to be generated.

\* \* \* \* \*